Figure 1:
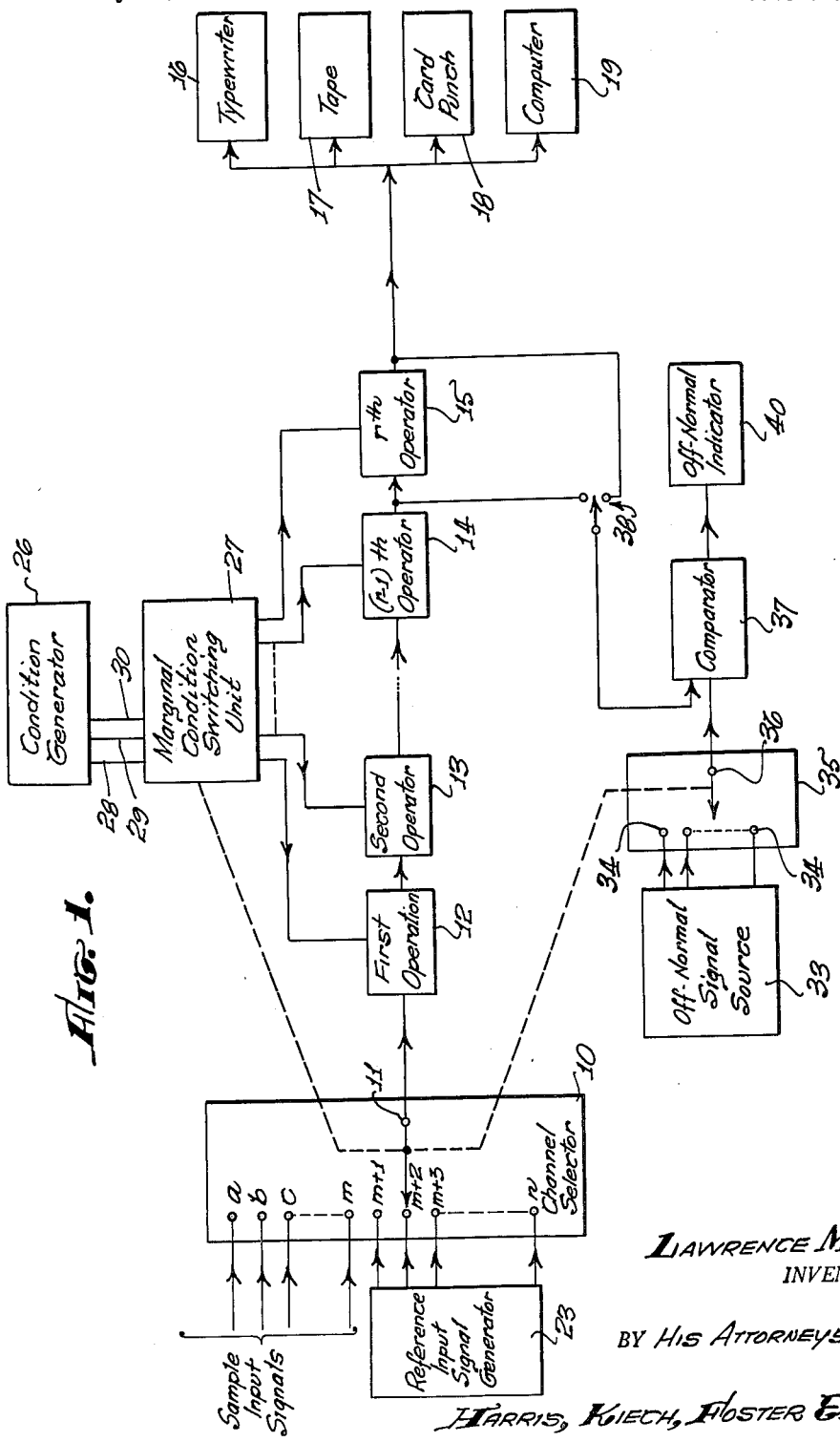

March 27, 1962 L. M. SILVA 3,027,542
AUTOMATIC MARGINAL CHECKING APPARATUS
Filed July 14, 1958 2 Sheets-Sheet 1

LAWRENCE M. SILVA,
INVENTOR.

BY HIS ATTORNEYS.

HARRIS, KIECH, FOSTER & HARRIS.

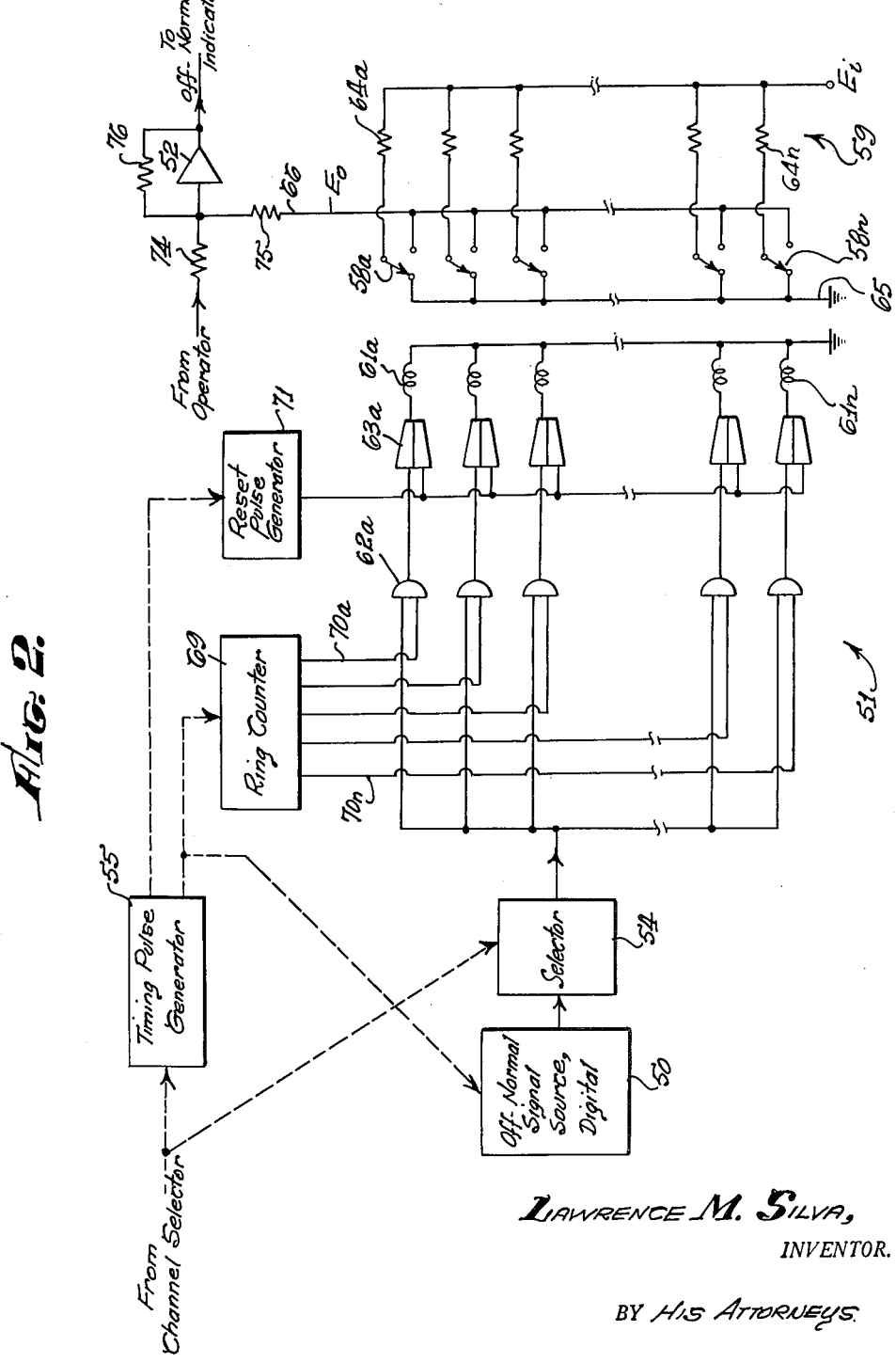

United States Patent Office

3,027,542
Patented Mar. 27, 1962

3,027,542
AUTOMATIC MARGINAL CHECKING APPARATUS
Lawrence M. Silva, Fullerton, Calif., assignor to Beckman Instruments, Inc., a corporation of California
Filed July 14, 1958, Ser. No. 748,446
10 Claims. (Cl. 340—147)

This invention relates to automatic marginal checking apparatus suitable for use with electronic computers, data handling devices, and similar systems. In particular, the invention relates to an apparatus for automatically providing a continuous check on the functioning of the system which the apparatus is associated with, which checking is carried out in sequence with the intended functioning of the system to provide off-normal or off-standard indications which can be used for alarm, interruption of operation, and/or automatic change-over to stand-by equipment.

The automatic marginal checking apparatus of the invention is suitable for use with systems such as the tabulating device shown in the patent to Langevin et al., No. 2,736,006, and the automatic process logging system shown in the patent to Anderson, No. 2,701,748.

In one type of data handling system with which the automatic marginal checking apparatus of the invention may be used, the information produced by a large number of status sensing devices such as thermocouples, pressure gauges, flowmeters, accelerometers, strain gauges, electrical meters and the like is collected, operated on, and recorded. The status sensing devices usually produce an electrical voltage which is a function of the quantity being measured and are generally referred to as transducers. The data handling system will collect information from a plurality of transducers, sampling or reading each individual transducer as often as desired, and convert the voltages from the transducers to numbers readable directly in the quantity being measured, i.e., 10 lbs., 107°, 15 gal. per minute, or 3 millivolts. The information will be presented in digital form suitable for use by a computer and/or a logging device such as a typewriter, a card punch or the like. The data handling system will also provide desired modifications or operations on the voltage signal obtained from the transducers. Such operations include amplification to provide desired signal level and proper scale factor, addition or subtraction for zero off-set, the taking of square roots, changing to logarithmic functions, and other computations, as well as analog-to-digital and digital-to-analog conversions. The data handling system often provides an off-normal or alarm indication when outputs from individual transducers depart from predetermined limits, which limits are preset in the system.

The units of such a system which carry out the operations on the transducer or sample input signals are generally referred to as operators. These operators require certain operating conditions in order to perform within specified limits. For example, an analog computer may produce an output voltage with a particular input signal, which output voltage is within specified limits only as long as the power supply voltages fall within certain tolerances, the power supply voltages being the operating conditions. If several similar analog computers are provided with the same input signal and the same operating conditions, i.e., the same supply voltages from their respective power supplies, all of the computers may produce a similar desired or standard output voltage. If the power supply voltage provided for each computer is raised or lowered, some of the computers will still perform within the specified limits while others will not. This performance is interpreted as an indication that the computers in the first category wherein the output remained within limits after an operating condition had been made nonoptimal are more reliable than the computers in the second category wherein the output was outside limits when one or more operating conditions were made nonoptimal. A marginal or reliability check on an operator may include a number of changes made in various operating conditions such as the voltage supply to the operator, phase shift in pulse series supplied to the operator for clock and timing purposes, wave form and magnitude of such pulses, and the like. Each of these changes in operating conditions, taken individually or in combination with other changes, may induce the output voltage to depart from the preset limits. This general form of checking is based on the assumption that an operator is most likely to perform within tolerances under standard operating conditions when it even behaves within the tolerances under nonstandard operating conditions.

It is an object of the invention to provide apparatus for performing marginal checking of an electronic system on an entirely automatic basis. A further object is to provide such an apparatus for use with systems that sequentially and repetitively sample variable input data and operate on the input data to provide output data wherein the marginal checking function is included in each sequence or in a group of sequences. A further object is to provide such an apparatus in which the marginal checking function is an integrated part of the repetitive sequence of operations performed by the system and one in which the input channel selector of the system may be used also to select reference input signals.

It is an object of the invention to provide an automatic marginal checking apparatus for use with a system having off-normal or alarm indication circuitry, in which an off-normal signal generator and comparator may be used both for the conventional off-normal function with sample input signals and standard operating conditions and for the checking function of the apparatus with reference input signals and nonstandard operating conditions.

It is another object of the invention to provide an automatic marginal checking apparatus which will provide a check on each individual operator of the system as well as a check on the over-all system. A further object is to provide such checking apparatus having an off-normal indicator for providing audible or visual indications and for actuating recorders, system interruption devices and unit change-over devices when an operator of the system is determined to be submarginal. Another object of the invention is to provide a checking apparatus which may operate both in the analog and digital domains.

It is an object of the invention to provide checking apparatus applicable to any nonsignal operating condition of the system including power supplied, wave forms, pulse timing and phasing.

Briefly, the invention contemplates providing one or more reference input signals of known magnitude in the sequence of sample input signals on which the system operates, providing specific nonstandard operating conditions for the operators when particular reference input signals are being operated on, and comparing the output values obtained under such operating conditions with predetermined limiting values. When the output values of the system fall outside the predetermined limiting values, an off-normal indication is provided which indicates that the sample input signals are outside of limits when the system is operating with standard operating conditions and that the system operators are sub-marginal when the system is operating with nonstandard operating conditions and reference input signals.

The invention also comprises novel details of construction and novel combinations and arrangements of elements, which will more fully appear in the course of the following description. The drawings merely show and the description merely describes a preferred embodiment of the present invention which is given by way of illustration or example.

In the drawings:

FIG. 1 is a block diagram showing a preferred embodiment of the invention associated with a data handling system; and FIG. 2 is a schematic diagram showing in greater detail an alternative version of a portion of the equipment of FIG. 1.

Referring now to the apparatus of FIG. 1, a channel selector 10 is provided with a plurality of input terminals $a$ to $n$ and an output terminal 11. The channel selector may take any conventional form, such as the stepping relay shown in FIG. 1, or a bank of relays, or a transistor switching circuit, or the like, the channel selector repetitively connecting the output terminal to the input terminals in a predetermined sequence. Sample input signals from transducers are connected to the input terminals $a$ through $m$. A sample input signal may be an A.C. voltage or a D.C. voltage and may be analog or digital in nature.

The output terminal 11 of the channel selector 10 is coupled as an input to a first operator 12 of the data handling system which comprises a plurality of operators. The data handling system includes a plurality of operators including a second operator 13, a $(r-1)$th operator 14 and an $r$th operator 15 which are serially connected to perform successive operations on the sample data. The output of each operator bears a predetermined relationship to the input thereto but the particular operation performed by each operator is not pertinent to the present invention. For example, the operators may provide amplification or multiplication, summing or zero offset, analog-to-digital conversion and digital-to-analog conversion, square root extraction, conversion to logarithmic and other functions, and the like. In a data handling system, the program of operations is not necessarily the same for each input terminal or channel. Some operators may be inactive for some input signals, different constants may be applied in connection with different input channels, some input signals after undergoing one or more operations may be stored for combination with subsequent input signals and, of course, some operations may take place in the analog domain and some in the digital domain. The output of the last operator is coupled to one or more output devices such as a typewriter 16, a tape recorder 17, a card punch 18, and a computer 19, for recording and/or further computation.

The above described apparatus is conventional in nature and is illustrative of the type of system with which the automatic marginal checking apparatus of the invention may be used.

A reference input signals generator 23 provides a plurality of reference input signals which are coupled to the input terminals $m+1$ through $n$ of the channel selector 10. Each of the reference input signals has a fixed magnitude and is preferably similar in nature to one or more of the sample input signals, i.e., a fixed D.C. voltage, an A.C. voltage of fixed frequency, wave form and magnitude. Thus the system can be operated to perform the same operations on the sample input signal connected to input terminal $a$ and the reference input signal connected to terminal $m+1$. In one embodiment of the invention now in use the channel selector has 400 input terminals of which 390 are connected to transducers and 10 to the reference input signal generator. Then the system is automatically checked with each scan of the input terminals by the channel selector. Alternatively, the reference input signals may be introduced into the system only following a plurality of scans of the sample input signals by using a different, though conventional, switching circuit.

The performance of each operator of the system depends on conditions extraneous to the active components of each of the stages and independent of the signals being operated on. These conditions include the supply voltages, the timing and phasing of pulse series and the wave form of pulses. These conditions are varied to marginal values to check the reliability of the operators. In the apparatus of FIG. 1, a condition generator 26, which may be a D.C. power supply or a pulse oscillator or the like, is connected to each of the operators by a marginal condition switching unit 27.

In one embodiment of the invention, the condition generator 26 may provide a standard operating voltage on a line 28, a high marginal operating voltage on a line 29 and a low marginal operating voltage on a line 30. The marginal condition switching unit 27 is operated in synchronism with the channel selector 10 to connect the standard voltage to each of the operators when input terminals $a$ through $m$ are being scanned and to connect either the high or low marginal voltage to particular operators when particular ones of the input terminals $m+1$ through $n$ are connected to the system. As was the case with the channel selector 10, the marginal condition switching unit may be a stepping relay, a bank of relays, a set of transistor switching circuits or the like. If, for example, the marginal condition switching unit 27 is a stepping relay similar to that shown as the channel selector 10, movable contacts of each will be driven together to achieve the prescribed synchronous operation.

In an alternative form the invention, the condition generator 26 could supply a series of clock pulses for the operators with one series having standard phasing and other series having marginal phase shifts with the switching unit 27 substituting marginal series for the standard series when predetermined reference input signals are being operated on.

In conducting the marginal checks, the marginal operating conditions may be connected to all of the operators simultaneously for an over-all system check and also may be connected to one or more of the operators separately for checking an operator or a group of operators independent of the remaining operators. Of course, the condition generator may provide the marginal operating conditions continuously or only when required for checking purposes, this operation being controlled by the switching unit 27.

An off-normal signal source 33 generates a plurality of off-normal signals which are connected to input terminals 34 of a selector 35, the selector having an output terminal 36 which is connected as an input to a comparator 37. The output of an operator is connected to the analog comparator 37 as another input thereto. Single-pole, double-throw switch 38 has stationary contacts respectively connected to the outputs of operators 14 and 15 and a movable contact connected to the input of comparator 37. Thus, the user may check the outputs of either operator 14 or operator 15 by actuating the movable contact of switch 38. Outputs from different operators may be selected if desired, such as by use of a switch 38 for selecting the output of operators 14 or 15.

The off-normal signal source 33 may comprise a plurality of separate power supplies, or may be a single supply generating a reference voltage across a potential divider which is branched to the input terminals 34 of the selector 35, or may provide digital bits in series or in parallel for direct use or conversion to analog form or may take any other conventional form. Selector 35 may take any conventional form, such as the stepping relay shown in FIG. 1, or a bank of relays, or a transistor switching circuit, or the like. The magnitudes of the off-normal signals provided by the off-normal signal source represent the tolerable deviations from normal of the output of the operator connected to the comparator for predetermined reference input signals. The off-normal signals may be, and usually are, also used to establish tolerable limits on the sample input signals from the transducers. For example, it may be desired to give an alarm, such as to ring a warning bell, when the pressure being sensed by a transducer coupled to input terminal *a* deviates from a predetermined range. This predetermined pressure range can, of course, be correlated with a sample input signal range at the input terminal and with an output range for an operator, such as the operator 14. The off-normal signal source 33 will be adjusted to provide an output to one of the terminals 34, corresponding to the low limit, and a second output to another terminal, corresponding to the high limit. Then when the channel selector 10 is connecting input terminal *a* to output terminal 11, the selector 35 will sequentially connect each of the previously mentioned terminals to the comparator 37 for comparison with the output from the operator 14. The comparator 37 is a device which compares two inputs and provides an output indicative of whether or not one particular input is greater or less than the other. Then if the output from the operator falls below the low limit or above the high limit, an indication of off-normal condition for the particular transducer will be provided.

The automatic checking apparatus operates in the same manner, with marginal limits of output for an operator being established for a particular reference input signal. The off-normal signal source is adjusted to provide off-normal signals representative of these marginal limits. Then when a particular reference input signal is being connected to the system by the channel selector 10, a particular nonstandard condition is connected to an operator by the marginal condition switching unit 27 and the output of an operator is compared with the off-normal signals from the off-normal signal source to determine if the system is functioning within the allowable limits.

Thus it is seen that the same off-normal signal source and comparator may be used for conventional off-normal indications with the system and for automatic marginal checking.

The comparator 37 may take the form of a conventional difference amplifier which produces a positive output when one input, say the input from the operator, is greater than the other input and a negative output when the reverse conditions exist. The output of the comparator may be connected to an off-normal indicator 40 which may in turn actuate a recorder, an audible or visual alarm, or initiate some control function. Since checks are often made for both above and below limits for a particular combination of reference input signal and marginal operating conditions, the comparator may provide both positive and negative outputs for this operating combination, both of which may be within limits or both outside the limits or one within limits and one outside limits. When checking with a low limit, the outputs on the operator should exceed the off-normal signal resulting in a positive output to the off-normal indicator for acceptable system operation, while, when checking a high limit, the operator output should be less than the off-normal signal resulting in a negative output to the off-normal indicator for acceptable system operation.

The particular relations of high and low limits, positive and negative outputs, and so forth set out above, are, of course, arbitrary and not essential to the invention, being selected as exemplary of the operation of the apparatus.

Although the apparatus shown in FIG. 1 has been primarily described so far as operating in the analog domain, this invention may also be operated in both the analog and digital domains or only the digital domain. For example, particular apparatus shown in FIG. 2 and described hereinafter stores the off-normal signals in digital form.

As a simple example of the operation of the automatic marginal checking apparatus, consider the situation where a D.C. sample input signal is to be printed out on the typewriter as a numerical value. Assume that the transducer is linear and produces ten millivolts sample input signal for 600 lbs. per square inch pressure and two millivolts input signal for zero pressure, and that six volts D.C. at an analog-to-digital converter which may be the operator 15, produces the number 600 in digital form for operation of the typewriter. Further assume that it is desired to have the system operate on this data with an accuracy of one percent of full scale, i.e., plus or minus six lbs. per square inch. Then one operator of the system would multiply or amplify the sample input signal by a factor of 1250 which is the scale factor of the transducer calibration. Another operator would reduce the amplified signal by exactly two volts which is the zero offset of the calibration. The resulting signal would then be converted to digital form and logged in the typewriter. In order to check the performance of the system, a reference input signal from the reference input signal generator is connected to the system, say a signal of exactly 4 millivolts. Four millivolts corresponds to 300 lbs. per square inch pressure and, therefore, the digital off-normal signal source is adjusted to provide an off-normal signal of 305 and an off-normal signal of 295. With the four millivolt reference input signal connected to the system, one or more nonstandard operating conditions are switched to the operators, for example, a reduction in the B plus voltage supply to the first operator which provides the multiplication or scale factor. Then the selector 35 connects the 305 off-normal signal to the comparator 37 and the off-normal indicator 40 will provide an off-normal indication if the output of the operator is greater than 305. Then the selector 35 connects the 295 off-normal signal to the comparator and the off-normal indicator will provide an off-normal indication if the output of the operator is less than 295. Then a different marginal operating condition may be used or a different operator may be tested with the same reference input signal and off-normal signals or a new reference input signal and off-normal signals may be selected depending upon the particular checking sequence desired. Of particular importance is the feature of the invention heretofore described which permits the system operating sequence and the checking sequence to be set in advance after which the system and the automatic marginal checking apparatus will operate automatically without supervision. A significant corollary to the automatic system checking provided by this invention is that equipment may be easily devised by those skilled in the art to automatically substitute stand-by operators for operators which have been determined to be outside the predetermined margins. The computer, data handling system, or other apparatus provided with the present invention may then continue to operate with little or no interruption due to a malfunctioning operator.

In FIG. 2, an alternative form of the invention is shown wherein off-normal signals are stored in digital form and are converted to analog form for comparison with analog outputs from the operators in the system. This circuit includes an off-normal signal source 50, a digital-to-analog converter 51 and a comparator amplifier 52. In the off-normal signal source 50, the off-normal limits are stored digitally and in serial form. The digital-to-analog converter 51 includes a conductance adder by means of which the serial digital bits are arranged as parrallel information and then converted to analog form. A selector switch 54 corresponding to the selector 35 of FIG. 1 is operated in synchronism with the channel selector 10 of FIG. 1 to select particular off-normal limits as a function of the particular input channel being sampled by the channel selector 10. The selector 54 will ordinarily sequentially sample a high limit and a low limit for each input position of the channel selector 10.

Timing pulse generator 55 provides a continuous series of clock pulses at a uniform repetition rate and may comprise, for example, a crystal-controlled oscillator. This generator is also energized by the channel selector 10 to provide a starter pulse to the off-normal signal source for initiating read out of the serially stored digital limit. This series of digital bits is converted to parallel form for actuating particular switches 58a–58n of a conductance adder 59 to produce an analog voltage $E_o$ as an input to the comparator amplifier 52. The switches 58a–58n are actuated by corresponding solenoids 61a–61n, with each solenoid being energized through a corresponding and gate 62 and a flip-flop 63.

In the conductance adder 59, a constant input voltage $E_i$ is connected to the moving contact of each of the switches 58a–58n through corresponding resistors 64a–64n. One fixed contact of each of the switches is connected to circuit ground at 65 and the other fixed contact is connected to the output line 66. In such a circuit, the output voltage $E_o$ is equal to the input voltage $E_i$ multiplied by the sum of the conductances of the resistors 64 that are connected to the output line 66 divided by the sum of the conductances of all the resistors in the circuit. As the sum of all the conductances and the magnitude of the input voltage are constant, the output voltage is directly related to the conductances of the resistors connected to the output line. Therefore, it is possible to generate any output voltage that is an integer multiple of the smallest voltage increment desired by suitably selecting the magnitudes of the resistors 64.

In order to generate a specific output voltage, it is necessary that all the switches 58 be in given positions simultaneously. The and gates 62, the flip-flops 63 and a ring counter 69 provide for retaining the serially read out off-signal information to provide the desired simultaneous actuation of the solenoids 61. The ring counter 69 generates a series of output pulses each of which is coupled to a different output lead 70a–70n with the ring counter being energized by the starter pulse from the timing pulse generator 55 which also energizes the off-normal signal source 50. The ring counter may be of any conventional type such as a series of magnetic core amplifiers each generating an output to a different output lead, or a gas counter, or selector tube such as a Dekatron or a Trochotron, or other suitable device.

After generation of a particular off-normal signal, all of the flip-flops 63 are reset by a pulse from a reset generator 71 which is energized from the timing pulse generator 55. At this time all of the solenoids 61 are unenergized and the moving contacts of the switches 58 are to the left as seen in FIG. 2. When initiated by the starter pulse, a number is fed out from the off-normal signal source serially to all of the and gates 62. When there is coincidence between the pulse from the off-normal signal source and the ring counter at a particular and gate, an output will be produced at the and gate to reverse the associated flip-flop 63 and actuate the corresponding solenoid and switch. Then when the complete number has been read out from the signal source, the proper switches 58 will have been actuated and there will be a voltage on the line 66 corresponding to the number stored in the signal source.

The signal from the system is connected to the comparator amplifier 52 through a resistor 74 and the off-normal signal is connected through a resistor 75. The comparator amplifier may be an operational amplifier with a feedback resistor 76 coupled thereacross. Ordinarily, the polarity of the off-normal signal will be opposite to that from the system and the magnitudes of the resistor 74, 75 will be equal. The amplifier 52 is desirably a very high gain unit so that very small differences between the off-normal signal and the signal from the system can be detected. The amplifier output is connected to the off-normal indicator 40 as in the circuit of FIG. 1.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A marginal checking apparatus for a data handling system or the like comprising the combination of: first generator means for generating a plurality of reference input signals; second generator means for generating a plurality of off-normal signals, with an off-normal signal corresponding to each of said reference input signals respectively; comparator means for comparing two inputs to provide an output indicative of a difference between the inputs thereto; a plurality of serially connected operators; a circuit for connecting the output of one of the operators as an input to said comparator means; and switching means for sequentially connecting each of said plurality of reference input signals to the first of the serially connected operators and simultaneously connecting a corresponding one of said off-normal signals as the other input to said comparator means.

2. A marginal checking apparatus for a data handling system or the like comprising the combination of: first generator means for generating a plurality of reference input signals; second generator means for generating a plurality of off-normal signals, with an off-normal signal corresponding to each of said reference input signals respectively; comparator means for comparing two inputs to provide an output indicative of a difference between the inputs thereto; a plurality of serially connected operators; a circuit for connecting the output of one of the operators as an input to said comparator means; third generator means for generating standard operating conditions and marginal operating conditions for energizing the operators, said standard operating conditions being substantially the optimum and said marginal operating conditions differing from the optimum by predetermined values; and switching means for sequentially connecting each of said plurality of reference input signals to the first of the serially connected operators and simultaneously connecting a corresponding one of said off-normal signals as the other input to said comparator means and simultaneously connecting predetermined ones of said standard conditions to certain of the operators and predetermined ones of said marginal conditions to at least one other operator for checking the operation of the other operator under particular preset marginal operating conditions with a predetermined reference input signal and a predetermined off-normal limit.

3. A marginal checking apparatus for a data handling system or the like comprising the combination of: first generator means for generating a plurality of reference input signals; second generator means for generating a plurality of off-normal signals, with an off-normal signal corresponding to each of said reference input signals respectively; comparator means for comparing two inputs to provide an output indicative of a difference between the inputs thereto; a plurality of serially connected operators; a circuit for connecting the output of one of the operators as an input to said comparator means, third generator means for generating standard operating conditions and marginal operating conditions for energizing the operators, said standard operating conditions being substantially the optimum and said marginal operating conditions differing from the optimum by predetermined values; first switching means for sequentially connecting each of said plurality of reference input signals to the first of the serially connected operators and simultaneously connecting a corresponding one of said off-normal signals as the other input to said comparator means and simultaneously connecting predetermined ones of said standard conditions to certain of the operators and predetermined ones of said marginal conditions to at least one other operator for checking the operation of the other operator under particular preset marginal operating conditions with a predetermined reference input signal and a predetermined off-normal limit; and an off-normal indicator actuated by the output of said comparator means to provide an indication when the off-normal signal connected to said comparator means is exceeded by the output of the operator connected to said comparator means.

4. A marginal checking apparatus for a data handling system or the like comprising the combination of: first generator means for generating a plurality of reference input signals; second generator means for generating a plurality of off-normal signals; a plurality of serially connected operators; third generator means for generating standard operating conditions and marginal operating conditions for energizing the operators, said standard operating conditions being substantially the optimum and said marginal operating conditions differing from the optimum by predetermined values; comparator means for comparing two inputs to provide an output indicative of a difference between the inputs thereto; a circuit for connecting the output of one of the operators as an input to said comparator means; and switching means for sequentially connecting said plurality of reference input signals to the first of the serially connected operators and simultaneously connecting an off-normal signal as the other input to said comparator means and simultaneously connecting predetermined ones of said standard conditions to certain of the operators and predetermined ones of said marginal conditions to at least one other operator, said second generator means generating at least one off-normal signal corresponding to each combination of reference input signal and standard and marginal operating conditions provided by said switching means.

5. Checking apparatus including in combination a system for successive operation on a plurality of sample signals; reference signal generating means for generating a plurality of reference signals; means for including said reference signals in the succession of sample signals whereon the system operates; means for generating standard conditions for the operation of the system; means for generating nonstandard conditions for the operation of the system; means for detecting off-normal outputs of the system that are higher or lower than preassessed values; and means for synchronizing the generation of said nonstandard conditions with said reference signals and generation of said standard conditions with said sample signals, whereby said off-normal detecting means indicates off-normal status in a sample signal when the system is operating on the sample signal and off-normal functioning in the system when the system is operating on a reference signal.

6. Checking apparatus including in combination a system for producing output signals in repeated sequences from a plurality of sample input signals, which sample input signals may vary from sequence to sequence; reference signal generating means for generating reference input signals of constant magnitude; means for the inclusion of said reference input signals in each of the repeated sequences; operation means for operating on said sample and reference input signals; standard condition generating means for generating a set of nonsignal carrying conditions for said operation means; marginal condition generating means for generating a different set of conditions for said operation means; means for selecting either said standard or marginal condition generating means for use with said operation means; and an off-normal indicating device for generating a signal when an output signal is lower or higher than a preassessed value, whereby said device indicates an off-normal value of a variable sample input signal operated on with said standard condition generating means, and indicates off-normal functioning in the system when operating on a reference input signal with said marginal condition generating means.

7. Checking apparatus including in combination a system for producing output signals in repetitive sequences from a plurality of sample input signals, which sample input signals may vary from sequence to sequence; means for generating reference input signals of predetermined magnitudes; input selector means for selecting said sample and reference input signals in a predetermined sequence; operating means for operating on said selected input signals; standard condition generating means for generating a predetermined set of non-signal carrying conditions in the system irrespective of signal magnitude; marginal condition generating means for generating a different set of conditions in the system; condition selecting means for selecting said standard conditions when the operating means are operating on a sample input signal and selecting said marginal conditions when the operating means are operating on a reference input signal; standard signal generating means for generating a plurality of standard signals; standard selector means operating in coordination with said input selector means to select one of said standard signals; means for establishing the sign of the difference between the selected standard signal and the output of said operating means; and means for generating a signal when this difference has a predetermined sign.

8. An apparatus for automatically checking the accuracy of a data handling system or the like under marginal operating conditions, including in combination: a plurality of operators for performing successive operations on sample input signals from a plurality of input channels; a power supply for the operators, said power supply producing a plurality of output voltages, at least one of said output voltages being a standard and others of said output voltages being off-standard by predetermined amounts; a first generator for producing reference input signals of predetermined value; a second generator for producing off-normal signals of predetermined value with particular off-normal signals corresponding to particular input channels and particular reference input signals; a comparator for providing an output indicative of the difference between two inputs thereto; a first circuit for connecting the output of an operator to said comparator as an input; a second circuit for sequentially connecting the sample and reference input signals to the operators and simultaneously connecting the corresponding off-normal signal to said comparator as the other input thereto; and a third circuit for substituting predetermined ones of said off-standard output voltages for said standard output voltages when said reference input signals are being connected to the operators.

9. An apparatus for automatically checking the accuracy of a data handling system or the like under marginal operating conditions, including in combination: a plurality of operators for performing successive operations on sample input signals from a plurality of input channels; a power supply for the operators, said power supply producing a plurality of output voltages, at least one of said output voltages being a standard and others of said output voltages being off-standard by predetermined amounts; a first generator for producing reference input signals of predetermined value; a second generator for producing off-normal signals of predetermined value with particular off-normal signals corresponding to particular input channels and particular reference input signals; a comparator for providing an output to an indicator indicative of the difference between two inputs thereto; a first circuit for connecting the output of an operator to said comparator as an input; a second circuit for sequentially connecting the sample and reference input signals to the operators and simultaneously connecting the corresponding off-normal signal to said comparator as the other input thereto; a third circuit for substituting predetermined off-standard output voltages for the standard output voltage to a plurality of the operators in sequence when a particular reference input signal is connected to the operators by said second circuit; and a selector circuit operated in timed relationship with said second and third circuits for connecting said comparator means output to the indicator only when the operator output differs from the off-normal signal connected to said comparator means in the same manner that the off-normal signal differs from the optimum operator output for the particular input signal connected to the operators.

10. An apparatus for automatically checking the accuracy of a data handling system or the like under marginal operating conditions, including in combination: a plurality of operators for performing successive operations on sample input signals from a plurality of input channels; a clock pulse supply for the operators, said supply producing series of pulses of standard phasing and series of pulses of non-standard phasing; a first generator for producing reference input signals of predetermined value; a second generator for producing off-normal signals of predetermined value with particular off-normal signals corresponding to particular input channels and particular reference input signals; a comparator for providing an output to an indicator indicative of the difference between two inputs thereto; a first circuit for connecting the output of an operator to said comparator as an input; a second circuit for sequentially connecting the sample and reference input signals to the operators and simultaneously connecting the corresponding off-normal signal to said comparator as the other input thereto; a third circuit for substituting predetermined ones of said nonstandard pulse series for said standard pulse series when said reference input signals are being connected to the operators; and a selector circuit operated in timed relationship with said second and third circuits for connecting said comparator means output to the indicator only when the operator output differs from the off-normal signal connected to said comparator means in the same manner that the off-normal signal differs from the output for the particular input signal connected to the operators.

References Cited in the file of this patent

UNITED STATES PATENTS

| | | |
|---|---|---|
| 2,039,405 | Green et al. | May 5, 1936 |
| 2,680,240 | Greenfield | June 1, 1954 |
| 2,945,915 | Strip | July 19, 1960 |

FOREIGN PATENTS

| | | |
|---|---|---|
| 738,800 | Great Britain | Oct. 19, 1955 |